United States Patent [19]
Stevens et al.

[11] 3,890,426
[45] June 17, 1975

[54] METHOD OF TREATING ALUNITE ORE

[75] Inventors: Douglas Stevens, Golden, Colo.;
Helge O. Forberg, Owensboro, Ky.;
Larry D. Jennings, Arvada, Colo.;
Frank M. Stephens, Jr., Lakewood,
Colo.; Francis J. Bowen, Golden,
Colo.

[73] Assignees: Southwire Company, Carrollton,
Ga.; National Steel Corporation,
Pittsburgh, Pa.; Earth Sciences, Inc.,
Golden, Colo.

[22] Filed: Mar. 21, 1974

[21] Appl. No.: 453,225

[52] U.S. Cl. .............. 423/127; 423/111; 423/118;
423/120; 423/122; 423/131; 423/629;
423/339; 423/567; 423/530
[51] Int. Cl........................... C01f 7/02; C01f 7/06
[58] Field of Search .......... 423/120, 118, 111, 127,
423/131, 629, 122; 75/97 R, 101 R

[56] References Cited
UNITED STATES PATENTS

| 1,070,324 | 8/1913 | Chappell | 423/131 |
| 1,189,254 | 7/1916 | Hershman et al. | 423/120 |
| 1,191,105 | 7/1916 | Hershman | 423/122 |
| 1,195,655 | 8/1916 | Chappell | 423/131 |
| 2,120,840 | 6/1938 | McCullough | 423/127 |
| 2,398,425 | 4/1946 | Haff | 423/120 |
| 3,652,208 | 3/1972 | Burk et al. | 423/127 |

*Primary Examiner*—Herbert T. Carter
*Attorney, Agent, or Firm*—Van C. Wilks; Herbert M. Hanegan; Stanley L. Tate

[57] ABSTRACT

This invention relates to a method for recovering aluminum hydroxide from ore containing alunite by roasting the ore to remove the water of hydration, leaching the roasted ore with a weak base to remove potassium and sulfate, extracting the aluminum content with a mixture of sodium hydroxide and potassium hydroxide, and precipitating aluminum hydroxide crystals from the solution.

21 Claims, 3 Drawing Figures

METHOD OF TREATING ALUNITE ORE

FIELD OF THE INVENTION

The present invention concerns a method of recovering aluminum hydroxide from ore containing alunite by calcination, leaching with a weak base, digestion with a mixture of sodium hydroxide and potassium hydroxide and a subsequent precipitation of aluminum hydroxide by cooling and seeding the resultant solution.

DESCRIPTION OF THE PRIOR ART

Various techniques have been proposed for recovering alumina from ore containing alunite. Of the various techniques disclosed in the prior art the general method involves treating alunite ore with concentrated sulfuric acid followed by roasting or vice versa, with $SO_3$ recovered as a bi-product and subsequently converted into sulfuric acid and reused in the process. Aluminum is retained in solution as a sulfate. Potash ($K_2O$) is then added at pH of between 1 and 2 to precipitate alum $[K_2SO_4Al_2(SO_4)_3 \cdot 18H_2O]$. After precipitation the alum is then roasted to disassociate the aluminum sulfate, with the production of $SO_3$ and aluminum oxide which is then recovered by crystallization. Ordinarily in the prior art practioners have used much effort and expense to eliminate potash. U.S. Pat. No. 1,948,887 (Saunders) is representative of prior art techniques. U.S. Pat. No. 1,406,890 (Pederson) further discloses the precipitation of "potash alum" by the addition of potassium sulfate to an acidic leach solution. Loevenstein in U.S. Pat. No. 2,958,580 teaches the recovery of aluminum as aluminum sulfate by digesting aluminum ore with sulfuric acid.

Although each of the aforementioned techniques may be useful for the particular application referred to, none of these conventional techniques however is suitable for recovering aluminum hydroxide from low grade aluminum ore containing alunite, which consists of aluminum, potassium, sodium, sulfate and water. Such ores being domestic to the United States in large quantities offer a relatively untouched source of aluminum.

SUMMARY OF THE INVENTION

The present invention concerns a method for recovering aluminum hydroxide from ore containing alunite by using a low temperature roast followed by leaching with a weak base and digestion with a mixture of sodium hydroxide and potassium hydroxide.

One object of the present invention is to provide a novel method for economically extracting aluminum hydroxide from ore containing alunite.

A further object of this invention is to provide a novel and economical method for separating aluminum hydroxide from ore containing alunite which consists of aluminum, potassium, sodium, sulfates and water.

These and other objects, features and advantages of the present invention will be apparent from the following decription and the accompanying drawings.

DESCRIPTION OF THE PREFERRED EMBODIMENTS

Figure 1:
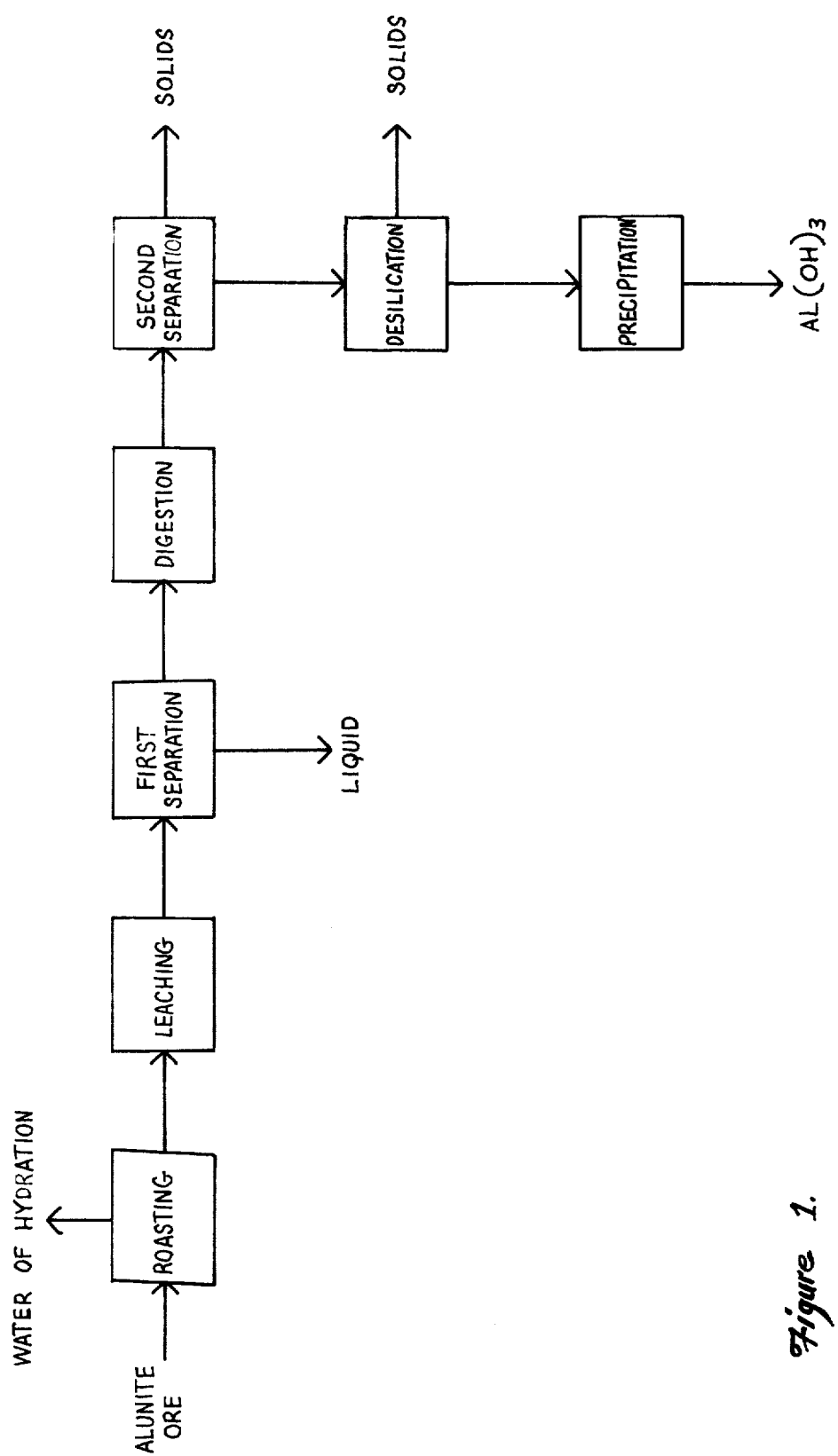
FIG. 1 is a general diagrammatic representation of an embodiment of the present invention.

Referring to FIG. 1, which is a general diagramatic flow sheet of an embodiment of this invention, ore containing what is commonly known as alunite, which has an approximate empirical formula of $[K_2Al_6(OH)_{12}(SO_4)_4]$ $Na_2Al_6(OH)_{12}(SO_4)_4$ and/or combinations thereof, is roasted to remove the water of hydration, leached with a weak base, and the liquid and solid components separated. The solid product of this separation is then digested with a mixture of alkali metal hydroxides and the liquid and solid components separated in a second separation step. The liquid portion resulting from the second separation is then seeded or heated to remove silica by precipitating sodium aluminum silicate. The remaining liquid is then cooled and/or seeded to precipitate and recover aluminum hydroxide.

Advantageously the alunite ore is roasted in the roasting step at a temperature of from about 400°C to about 850°C, preferably the ore is roasted at a temperature of from about 500°C to about 650°C, in order to effect removal of the water of hydration. Advantageously, the roasting step is carried out at atmospheric pressure and the preferred temperature is maintained for from about one-half minute to about six hours. The residence time within the roasting step varies greatly depending upon the type equipment used.

In the leaching step the roasted ore is advantageously leached with a base selected from the group consisting of ammonium hydroxide and alkali metal hydroxides at a pH of between about 8 and about 12 to dissolve sulfates and alkali metals. Preferably the leaching step is carried out at a temperature of up to about 100°C and for a time of from about five minutes to about two hours. Ammonium hydroxide is the most preferred base for use in the leaching step, and the preferred concentration is from about 12.5 to about 32 grams free ammonia per liter of solution.

The liquid and solid components from the leaching step are separated in the first separation step by conventional means such as thickener tanks, filters, belt extractor filters, and the like.

The solid content separated is then digested with a mixture of alkali metal hydroxides having a concentration of up to about 300 grams per liter caustic expressed as $Na_2CO_3$. Preferably the alkali metal hydroxides are sodium hydroxide and potassium hydroxide. The mixture ratio can vary from about 20 percent to about 100 percent sodium hydroxide, to about 80 percent to about 0 percent potassium hydroxide. Preferably the mixture contains in excess of 50 percent sodium hydroxide. Advantageously the digestion conditions are atmospheric pressure, a temperature of from about 80°C to about 110°C, and a digestion time of from about five minutes to about two hours.

The digestion product is then separated in the second separation step by conventional methods such as thickener tanks, filters, and the like. Excess silica is then removed from the separated liquid content by heating the liquid and/or by seeding the liquid with sodium aluminum silicates. Advantageously agitation is applied to this liquid portion during the removal of excess silica. If atmospheric pressure is used in the heating step a temperature of about 90°C for a time of at least one hour is required. If pressure in excess of atmospheric pressure is used a temperature of from about 90°C to about 200°C is required to precipitate the sodium aluminum silicate in a time of at least 15 minutes. Advantageously the heating is carried out at a pressure of from about 0.5 atmosphere to about 7 atmospheres. Aluminum hydroxide seed crystals may then be added to the solution and upon cooling crystals of aluminum hydroxide are formed, precipitated and are separated from the solution as crystalline aluminum hydroxide.

Prior to the roasting step the alunite ore optionally may be crushed to a particle size having a greatest distance between parallel opposite exterior surfaces of about one inch or less. Optionally the product may be ground to a particle size of about eight mesh or less subsequent to the roasting step.

Figure 2:
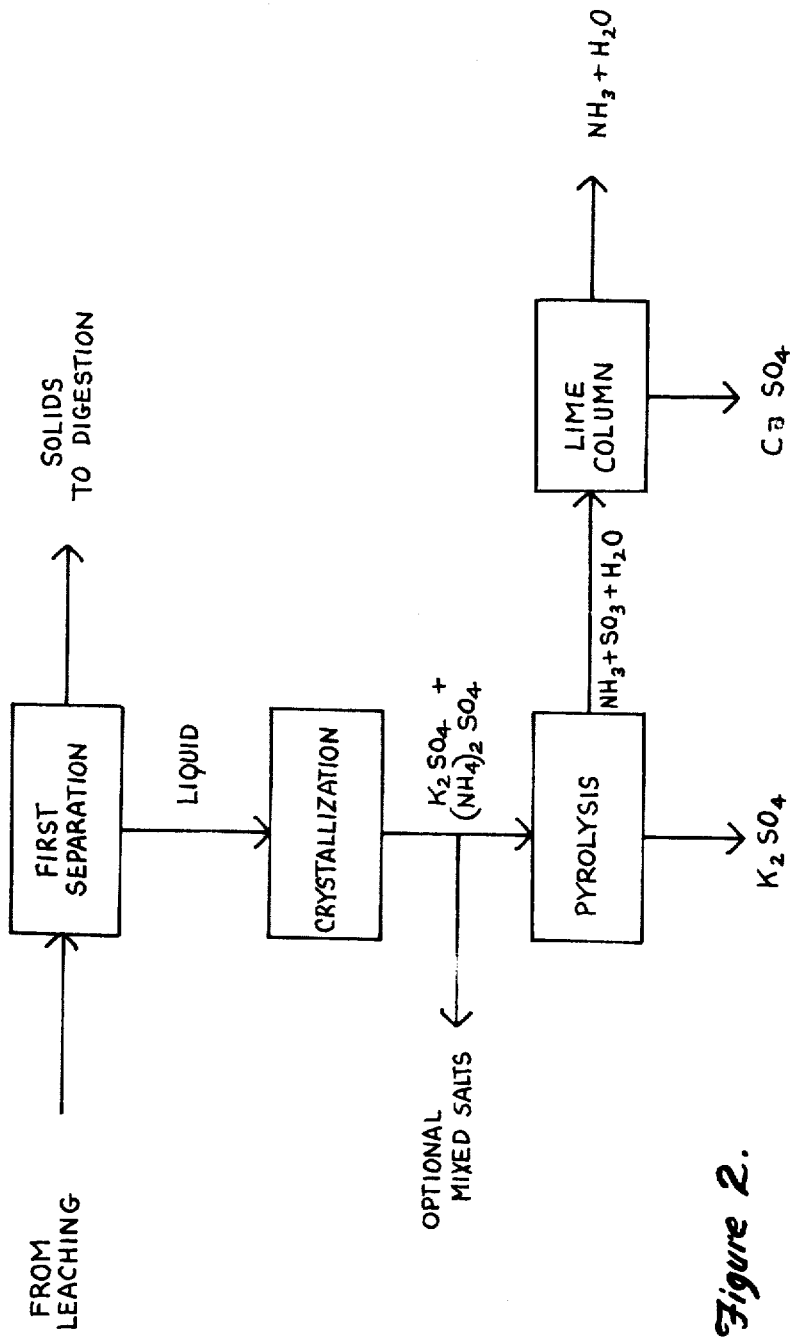
FIG. 2 is a diagrammatic representation of an embodiment of the present invention depicting bi-product recovery.

Referring to FIG. 2 in more detail, the liquid from the first separation step optionally may be processed by vacuum or cooling crystallization to precipitate a mixture of ammonium sulfate and potassium sulfate when ammonia is the weak base employed in the leaching step, or sodium and potassium sulfate when sodium hydroxide and potassium hydroxide are the base. When using ammonia, the preferred base, the mixture of ammonium sulfate and potassium sulfate is removed from the solution by filtering, centrifuging or the like. The mixed salts can either be marketed as such or fed to the pyrolysis unit shown in FIG. 2, where the ammonium sulfate is pyrolyzed at a temperature of about 300°C to about 400°C to yield ammonia, water, and sulfur trioxide. The pyrolysis unit can be a fluidized bed reactor, a rotating kiln, a shaft furnace or the like. Vapors from the pyrolysis unit are then passed through a column of pebble lime which reacts with the sulfur trioxide produced by the pyrolysis to form calcium sulfate. The ammonia and water produced by the pyrolysis are also passed through the lime column before being recycled to the weak base leaching step. Calcium sulfate so produced can then be either prepared for marketing or discarded as a waste.

The liquid content separated in the first separation step of FIG. 2 optionally may be processed by adding a weak base, such as ammonia, thereby precipitating potassium sulfate. The liquid may then be boiled in a lime boil step in the presence of lime [Ca(OH)$_2$], preferably in excess of stoichiometric amounts at atmospheric pressure, a reaction time of from about fifteen minutes to about one and one-half hours. The product of the lime boil step is then separated by conventional means such as centrifuge, filter, thickener tanks, vacuum distillation or crystallization, and the like. The liquid portion then can be recycled to use in the leaching step and the solid precipitated sulfate converted to commercial products such as sulfuric acid, elemental sulfur and the like.

Figure 3:
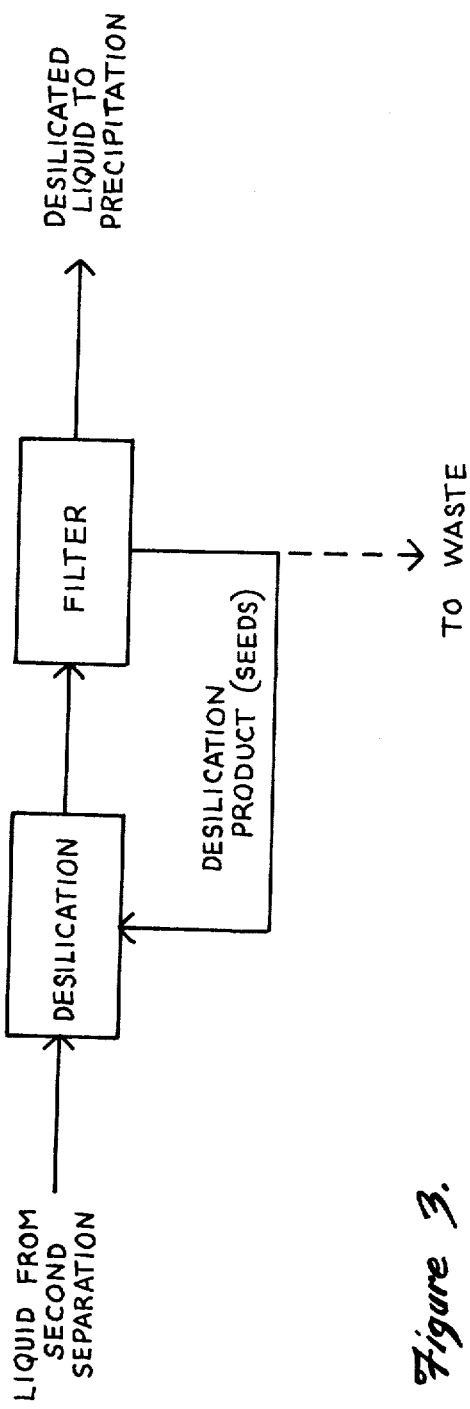
FIG. 3 is a diagramatic representation of an embodiment of the present invention depicting an optional method of silica removal.

Referring to FIG. 3 in more detail, the product formed in the silica removal step optionally may be filtered and the liquid solution containing aluminum hydroxide transferred to the precipitation step. The solid content filtered is sodium aluminum silicate with or without a sulfate ion depending upon the concentration of silicon and sulfate in the solution.

After removal of silica (precipitated as sodium aluminum silicate) the resultant liquid is cooled to precipitate crystalline aluminum hydroxide, which is then separated from the liquid. Advantageously the liquid is seeded with aluminum hydroxide crystals during the cooling step to accelerate the rate of precipitation and control the particle size of crystalline aluminum hydroxide.

The liquid from the precipitation step of FIG. 2 (sodium and potassium hydroxide) optionally may be recycled and used in the digestion step. The solid content of the precipitation step may be washed with water or with a dilute acid.

The aluminum hydroxide product from the precipitation step of FIG. 1 optionally may be calcined (heated) to form alumina ($Al_2O_3$).

The following specific examples are intended to be illustrative of the invention, but not limiting of the scope thereof.

EXAMPLE NO. 1

Fifty (50) grams of alunite calcine were mixed with water containing 32 grams per liter free ammonia so that the slurry contained 17 percent solids. The resultant slurry was heated to from about 85°C to about 90°C and agitated for two hours, the slurry was then filtered and the cake washed with a solution consisting of 20 grams per liter free ammonia in water, and with water. Upon analysis of the cake 92.5 percent of the potassium present before leaching was removed by the ammonia leach and 93.5 percent of the sulfate present prior to leaching was removed. Only one percent of the $Al_2O_3$ present before leaching was extracted during this step.

143 grams of the ammonia leach residue were digested in 340 ml of mixed caustic having a caustic concentration of 220 grams per liter as $Na_2CO_3$. The slurry was boiled at a pressure of one atmosphere with mechanical agitation for 60 minutes and filtered. Upon analysis the filtrate was found to contain 74 grams per liter $Al_2O_3$ and 1.16 grams per liter $SiO_2$. When compared with the $Al_2O_3$ and content of the starting materials it was found that 88 percent of the $Al_2O_3$ present prior to the leach of Example No. 1 had been removed in this caustic digestion step.

EXAMPLE NO. 2

A quantity of leached alunite calcine was digested as in Example No. 1. Boiling temperatures were used to insure maximum alumina digestion. A paddle stirer was used to provide agitation. After digestion, the mixture was filtered by suction.

In the case of the solution reported herein, the proportions were 1200 milliliters of 250 grams per liter NaOH and 600 grams of leached alunite calcine. Due to test losses, only about 850 milliliters of liquor were obtained. Enough demineralized water was added by washing the filter cake to provide one liter of liquor. At this point the solution contained 200 gm/l free caustic, 91 gm/l $Al_2O_3$ and 3.60 gm/l $SiO_2$.

143 grams of the ammonia leach residue were digested in 340 ml of mixed caustic having a caustic concentration of 220 grams per liter as $Na_2CO_3$. The slurry was boiled at a pressure of one atmosphere with mechanical agitation for 60 minutes and filtered. Upon analysis the filtrate was found to contain 72.5 grams per liter $Al_2O_3$ and 1.03 grams per liter $SiO_2$. When compared with the $Al_2O_3$ content of the starting materials it was found that 86 percent of the $Al_2O_3$ present prior to the leach of Example No. 1 had been removed in this caustic digestion step.

This invention has been described in detail with particular reference to preferred embodiments thereof, it should be understood that variations and modifications can be effected within the spirit and scope of the invention as described hereinbefore and as defined in the appended claims.

What is claimed is:

1. A method for recovering aluminum hydroxide from ore containing alunite comprising the steps of:
   a. roasting the ore to remove the water of hydration,
   b. leaching the roasted ore from Step (a) with a weak base at a pH of from about 8 to about 12 to dissolve sulfate and alkali metals,
   c. separating the liquid and solid portions of the slurry resulting from Step (b), said liquid portion containing dissolved sulfate and alkali metals,
   d. digesting the solid portion from Step (c) with an aqueous mixture of alkali metal hydroxides at a concentration and at a temperature sufficient to extract the aluminum content from said solid portion,
   e. separating the liquid and solid portions of the slurry resulting from Step (d),
   f. precipitating silica from the liquid portion resulting from Step (e),
   g. separating the liquid and solid portions resulting from Step (f),
   h. precipitating aluminum hydroxide from the liquid portion resulting from Step (g),
   i. separating the aluminum hydroxide precipitate from the liquid portion resulting from Step (h).

2. The method of claim 1 wherein Step (a) is performed at a temperature of from about 400°C to about 850°C.

3. The method of claim 1 wherein Step (a) is performed at a temperature of from about 500°C to about 650°C.

4. The method of claim 1 wherein the weak base of Step (b) is selected from the group consisting of ammonium hydroxide and alkali metal hydroxides.

5. The method of claim 1 in which Step (b) is performed at a temperature of from about 20°C to about 120°C and for a time of at least five minutes.

6. The method of claim 1 in which the sulfate separated in Step (c) is converted to sulfuric acid.

7. The method of claim 1 in which the sulfate separated in Step (c) is converted to elemental sulfur.

8. The method of claim 1 in which potassium sulfate is recovered from the liquid content of Step (c).

9. The method of claim 1 wherein the alkali metal hydroxides of Step (d) are selected from the group consisting of sodium hydroxide and potassium hydroxide.

10. The method of claim 1 in which the precipitation of silica of Step (f) is performed by heating the liquid to a temperature of about 90°C for at least one hour at atmospheric pressure.

11. The method of claim 1 in which the precipitation of silica of Step (f) is performed by heating the liquid at a pressure of from about 0.5 atmosphere to about 7 atmospheres at a temperature of from about 90°C to about 200°C and for at least fifteen minutes.

12. The method of claim 1 in which the precipitation of silica in Step (f) is accelerated by seeding with sodium aluminum silicates.

13. The method of claim 1 in which the precipitation of aluminum hydroxide in Step (h) is performed by cooling the liquid until crystalline aluminum hydroxide is formed.

14. The method of claim 1 further including accelerating the precipitation of aluminum hydroxide in Step (h) by seeding the liquid with aluminum hydroxide crystals.

15. The method of claim 1 including the additional step of washing the precipitation product of Step (i) with water.

16. The method of claim 1 including the additional step of washing the precipitation product of Step (i) with an acid having a pH of about 4.5.

17. The method of claim 1 including the additional step of calcining the aluminum hydroxide precipitation product of Step (i).

18. The method of claim 1 including the additional step of crushing the ore containing alunite to a particle size having a greatest distance between parallel opposite exterior surfaces of about one inch or less prior to Step (a).

19. The method of claim 1 including the additional step of reducing the size of the product of Step (a) to a particle size of about 8 mesh or less before proceeding to Step (b).

20. The method of claim 1 including the additional step of recovering $SiO_2$ from the solid content separated in Step (e).

21. The method of claim 1 including the additional step of filtering the solution formed in Step (f) to yield sodium aluminum silicate solids and sodium aluminum sulfate solids.

* * * * *